(12) United States Patent
Park et al.

(10) Patent No.: US 9,914,105 B2
(45) Date of Patent: Mar. 13, 2018

(54) PHASE-CHANGE SUSPENSION FLUID COMPOSITION INCLUDING POLYETHYLENE OXIDE PARTICLES AND METHOD FOR MANUFACTURING THE SAME

(71) Applicant: Hyundai Motor Company, Seoul (KR)

(72) Inventors: Jong Min Park, Incheon (KR); Jae Sik Seo, Seoul (KR); Kyung Mo Yang, Suwon-si (KR); Dae Sung Chang, Anyang-si (KR); Hyung Jin Choi, Seoul (KR)

(73) Assignee: Hyundai Motor Company, Seoul (KR)

( * ) Notice: Subject to any disclaimer, the term of this patent is extended or adjusted under 35 U.S.C. 154(b) by 271 days.

(21) Appl. No.: 14/717,711

(22) Filed: May 20, 2015

(65) Prior Publication Data
US 2016/0129414 A1 May 12, 2016

(30) Foreign Application Priority Data
Nov. 7, 2014 (KR) .......... 10-2014-0154262

(51) Int. Cl.
*F16F 9/49* (2006.01)
*B01J 13/00* (2006.01)
*F16F 13/14* (2006.01)

(52) U.S. Cl.
CPC ....... *B01J 13/0021* (2013.01); *B01J 13/0082* (2013.01); *F16F 9/49* (2013.01); *F16F 13/14* (2013.01)

(58) Field of Classification Search
CPC B01J 13/0021; B01J 13/0082; C10M 145/28; C10M 2209/1016; C10M 145/04; C10M 2209/104; C10M 2209/1045; F16F 13/14; F16F 9/49
USPC .... 267/292–294, 140.2–140.4, 141.1–141.7; 475/92
See application file for complete search history.

(56) References Cited

U.S. PATENT DOCUMENTS

| | | | | |
|---|---|---|---|---|
| 2,889,983 A * | 6/1959 | MacKlis | ............ | B01D 19/0052 494/37 |
| 3,900,378 A * | 8/1975 | Yen | .............. | A01G 9/1086 47/9 |
| 3,954,962 A * | 5/1976 | Prussin | ............. | A61K 8/463 424/49 |
| 4,699,666 A * | 10/1987 | Tidquist | .............. | B08B 17/00 106/287.23 |
| 5,087,021 A * | 2/1992 | Tanahashi | ........... | F16F 13/1436 267/140.12 |
| 5,653,921 A * | 8/1997 | Jenkner | ............... | A43B 13/187 264/4 |
| 5,667,895 A * | 9/1997 | Jenkner | ............... | A43B 13/187 251/263 |
| 5,948,387 A * | 9/1999 | Unger | ................. | A61K 49/223 424/9.5 |
| 6,866,630 B2 * | 3/2005 | Larson | .................. | A61L 31/06 600/437 |
| 2006/0264337 A1 | 11/2006 | Wenderoth et al. | | |

FOREIGN PATENT DOCUMENTS

| | | | |
|---|---|---|---|
| JP | 7-173479 | A | 7/1995 |
| JP | 2956402 | B2 | 10/1999 |
| KR | 10-2001-0006469 | A | 1/2001 |
| KR | 10-2010-0125980 | | * 12/2010 |
| WO | 2010/092010 | A1 | 8/2010 |

OTHER PUBLICATIONS

Polyox Water-Soluble Resins, Form No. 326-00001-0302 AMS, DOW, www.polyox.com, Published Mar. 2002, online @ www.dow.com/scripts/litorder.asp?filepath=/pdfs/noreg/326-00001.pdf &pdf=true (downloaded Apr. 6, 2017), pp. 1-24.*
Yu et al., "Viscoelastic Properties of Poly(ethylene oxide) Solution", Journal of Pharmaceutical Sciences, vol. 83, No. 10, Oct. 1994, pp. 1443-1449.*
English language machine translation, KR 10-2010-0125980, published Dec. 1, 2010, online @ http://engpat.kipris.or.kr/pmt/patent/patentRTT.jsp, Downloaded Apr. 11, 2017), pp. 1-8.*
Arnolds, O. et al., "Capillary breakup extensional rheometry (CaBER) on semi-dilute and concentrated polyethyleneoxide (PEO) solutions", Rheol Acta, 2010, 49: 1207-1217.
Halefadl, S. et al., "Viscosity of carbon nanotubes water-based nanofluids: Influence of concentration and temperature", International Journal of Thermal Sciences, 71, 2013, 111-117.

\* cited by examiner

*Primary Examiner* — Daniel S Metzmaier
(74) *Attorney, Agent, or Firm* — McDermott Will & Emery LLP (57) ABSTRACT

A suspension fluid prepared by dispersing polyethylene oxide particles into a solvent including water and one or more types of compounds selected from the group consisting of ethylene glycol and propylene glycol, and a method for manufacturing the same. The phase-change suspension fluid can be a shear-thinning fluid showing a constant newtonian behavior in a low shear rate or low frequency region, but showing a non-newtonian behavior appearing as liquid-like suspension in a high shear rate or high frequency region due to viscosity decrease, and is capable of reversible phase changes by the vibration of a vehicle, and therefore, may provide effects of having advantages of a hydraulic bush in a low frequency region and also having advantages of a solid bush in a high frequency region.

6 Claims, 14 Drawing Sheets

PHASE-CHANGE SUSPENSION FLUID COMPOSITION INCLUDING POLYETHYLENE OXIDE PARTICLES AND METHOD FOR MANUFACTURING THE SAME

CROSS-REFERENCE TO RELATED APPLICATION

This application claims under 35 U.S.C. § 119(a) the benefit of Korean Patent Application No. 10-2014-0154262 filed on Nov. 7, 2014, the entire contents of which are hereby incorporated by reference herein.

BACKGROUND (a) Technical Field

The present disclosure relates to a phase-change suspension fluid composition including polyethylene oxide particles and a method for manufacturing the same. More particularly, it relates to a phase-change suspension fluid composition prepared by dispersing polyethylene oxide particles into a solvent including water and one or more types of compounds selected from the group consisting of ethylene glycol and propylene glycol, and a method for manufacturing the same.

(b) Background Art

'Phase-change fluids' collectively refer to fluids of which mechanical and physical properties change by an external force applied, and are generally divided into shear thickening fluids (STF) and shear thinning fluids.

A shear thickening fluid (STF) is formed with concentrated suspension colloids in which unaggregated solid particles are dispersed into fluids, and viscosity is shown to distinctly increase when exceeding a critical shear rate [Xianzhou Zhang, Weihua Li, Gong, X. L., Smart Mater. Struct., Vol. 17, 015051 (2008)].

Under a high shear rate, viscosity of a shear thickening fluid (STF) increases, and the fluid becomes a solid-like suspension, and when shock stress is removed, the shear thickening fluid (STF) reversibly goes back to a liquid-like state quickly [Chang, L., Friedrich, K., Schlarb, A. K., Tanner, R., Ye, L., J Mater Sci, Vol. 46, 339-346 (2011)].

Meanwhile, a shear thinning fluid has a property that, in a normal flow, viscosity decreases as shear rate increases, and shear rate and viscosity are inversely proportional. In addition, a shear thinning fluid usually has a yield point, and such a material has no flowability under low shear stress, and has flowability (liquidity) only when a yield point is reached.

Particularly, a phase-change fluid is a fluid having a property that nanoparticles show a liquidification phenomenon under a high shear rate due to a sudden decrease of viscosity, and is generally present as being dispersed into a solvent such as ethylene glycol (EG), propylene glycol (PG), ethylene glycol (EG)/water or propylene glycol (PG)/water.

Nanoparticles have been a subject of much research due to a hydrocluster phenomenon between particles. However, a hydrocluster phenomenon between nanoparticles has a rather big difference compared to various theoretically proposed models depending on size of particles. Phase-change fluids show viscosity changes and yield stress behavior by an external force applied, and reaction is very fast and reversible with respect to the external force applied, and this is referred to as a 'phase-change effect'. Such a phase-change fluid shows the behavior of a Bingham fluid having yield stress, and the yield stress may be obtained as the function of a shear rate.

These fluids may be used for a variable damping mechanism that is capable of controlling movement such as a brake, an engine mount, a damper and a bush, and power systems such as a brake and clutch, and are broadening their application to automotive and aviation industries, and robot industries as well.

As one example, an existing fluid-filled hydraulic bush is a component filling and sealing a fluid using cured rubber part, and may provide relatively more superior ride comfort caused by a spring-like property due to the combination of rubber elasticity and a fluid.

However, such a fluid-filled hydraulic bush has a limit, and this is due to the fact that all vehicle driving conditions having various changes may not be satisfied with just a constant amount of the fluid injected. In addition, fluids that have been used in the art are newtonian fluids showing a newtonian behavior having almost no viscosity changes by a frequency or a shear rate. Fluids absorb vibration when moving along a flow path, and such a fluid-filled hydraulic bush has a limit in that high speed operation stability and durability are inferior while having excellent ride comfort compared to general solid-type bushes.

Meanwhile, the Korean Patent Application Laid-Open Publication No. 10-2010-0125980 discloses a fluid-filled hydraulic bush capable of adjusting the amount of injected fluids. However, the constitution of the disclosed bush is not simple and, therefore, there is a limit in vehicle applications and a disadvantage in cost.

Generally, conventional hydraulic bushes have an excellent loss factor in a low frequency region compared to solid-type bushes, but may show an excessive increase in a dynamic spring constant due to a frequency increase, and in addition, when reviewing vehicle driving evaluation results, hydraulic bushes have a vibration isolation effect in a low frequency region compared to solid-type bushes, but may show an occurrence of excessive vertical vibration due to a frequency increase. Therefore, advantages of hydraulic bushes and advantages of solid-type bushes need to coexist.

Consequently, the needs for developing a fluid filled hydraulic bush and thereby developing an intelligent polymer-based dispersion fluid having advantages of a hydraulic bush in a low frequency region and advantages of a solid-type bush in a high frequency region, and capable of reversible phase changes by the vibration of vehicles have been raised.

The above information disclosed in this Background section is only for enhancement of understanding of the background of the disclosure and therefore it may contain information that does not form the prior art that is already known in this country to a person of ordinary skill in the art.

SUMMARY OF THE DISCLOSURE

The present disclosure has been made in an effort to solve the above-described problems associated with prior art, and the inventors of the present disclosure have found that a suspension fluid prepared by dispersing polyethylene oxide particles into a solvent including water and one or more types of compounds selected from the group consisting of ethylene glycol and propylene glycol is a shear-thinning fluid showing a constant newtonian behavior in a low shear rate or low frequency region, but showing a non-newtonian behavior appearing as liquid-like suspension in a high shear rate or high frequency region due to viscosity decrease, and accordingly, advantages of a hydraulic bush may be obtained in a low frequency region and advantages of a solid-type bush may be obtained in a high frequency region, and completed the present disclosure.

Accordingly, an object of the present disclosure is to provide a phase-change suspension fluid composition including polyethylene oxide particles.

Another object of the present disclosure is to provide a method for manufacturing a phase-change suspension fluid.

Still another object of the present disclosure is to provide an automotive hydraulic bush including the phase-change suspension fluid manufactured using the method above.

In one aspect, the present disclosure provides a phase-change suspension fluid composition including polyethylene oxide particles, which includes polyethylene oxide particles; and a solvent including water and one or more types of compounds selected from the group consisting of ethylene glycol and propylene glycol.

In another aspect, the present disclosure provides a method for manufacturing a phase-change suspension fluid including (i) preparing a suspension fluid by mixing and dispersing polyethylene oxide particles into a solvent including water and one or more types of compounds selected from the group consisting of ethylene glycol and propylene glycol; (ii) ultrasonicating the suspension fluid; and (iii) removing air by placing the ultrasonicated suspension fluid in a vacuum chamber.

In still another aspect, the present disclosure provides an automotive hydraulic bush including the phase-change suspension fluid manufactured using the method described above.

A phase-change suspension fluid according to the present disclosure is a fluid exhibiting a shear-thinning flow behavior property, and is capable of reversible phase changes by the vibration of a vehicle, and therefore, may provide effects of having advantages of a hydraulic bush in a low frequency region and also having advantages of a solid bush in a high frequency region.

Accordingly, a phase-change suspension fluid according to the present disclosure may actively control a vehicle and thereby is capable of improving riding comfort and an operation performance, and may also be used for variable damping mechanism that is capable of controlling damping such as a suspension system, an isolator and an engine mount, and power systems such as a brake and a clutch, and widely used in automotive and aviation industries.

Other aspects and preferred embodiments of the disclosure are discussed infra.

BRIEF DESCRIPTION OF THE DRAWINGS

The above and other features of the present disclosure will now be described in detail with reference to certain exemplary embodiments thereof illustrated in the accompanying drawings which are given hereinbelow by way of illustration only, and thus are not limitative of the present disclosure, and wherein.

It should be understood that the appended drawings are not necessarily to scale, presenting a somewhat simplified representation of various preferred features illustrative of the basic principles of the disclosure. The specific design features of the present disclosure as disclosed herein, including, for example, specific dimensions, orientations, locations, and shapes will be determined in part by the particular intended application and use environment.

In the figures, reference numbers refer to the same or equivalent parts of the present disclosure throughout the several figures of the drawing.

DETAILED DESCRIPTION

Hereinafter reference will now be made in detail to various embodiments of the present disclosure, examples of which are illustrated in the accompanying drawings and described below. While the disclosure will be described in conjunction with exemplary embodiments, it will be understood that present description is not intended to limit the disclosure to those exemplary embodiments. On the contrary, the disclosure is intended to cover not only the exemplary embodiments, but also various alternatives, modifications, equivalents and other embodiments, which may be included within the spirit and scope of the disclosure as defined by the appended claims.

A phase-change suspension fluid composition according to the present disclosure includes polyethylene oxide particles; and a solvent including water and one or more types of compounds selected from the group consisting of ethylene glycol and propylene glycol.

Specifically, the polyethylene oxide particles used in the present disclosure are a 'phase-change polymer', and the phase-change suspension fluid composition according to the present disclosure is a phase-change fluid present in the form of a suspension fluid (suspension) by mixing and dispersing these particles into a solvent including water and one or more types of compounds selected from the group consisting of ethylene glycol and propylene glycol.

Herein, the polyethylene oxide particles preferably have a weight average molecular weight (Mw) of 100,000 to 900,000. When the weight average molecular weight is less than 100,000, there is a problem in that polyethylene oxide having a low molecular weight is included in large quantities causing changes in the fluid purity, and when the weight average molecular weight is greater than 900,000, polyethylene oxide having a high molecular weight is included in large quantities causing an increase in the fluid viscosity, which leads to a problem in a fluid filling procedure. Therefore, using polyethylene oxide particles having a molecular weight in the above range is favorable.

In addition, commercially available polyethylene oxide has a weight average molecular weight of 100,000, and polyethylene oxide particles having a weight average molecular weight of less than 100,000 is difficult to produce, and when the weight average molecular weight is 900,000 or greater, there is a problem in the preparation of a sample using the same manufacturing method as the examples. Therefore, using polyethylene oxide having a weight average molecular weight of 100,000 to 900,000 is preferable.

In addition, the polyethylene oxide particles are preferably used in 5% to 30% by weight with respect to the total weight of the phase-change suspension fluid composition, and more preferably used in 5% to 20% by weight. When the polyethylene oxide particles are included in less than 5% by weight, a newtonian fluid behavior is shown, and when the polyethylene oxide particles are included in greater than 30% by weight, the viscosity is high and the use as a fluid in a hydraulic bush is not suitable. Therefore, the polyethylene oxide particles are preferably used in the range described above.

Moreover, the present disclosure provides a method for manufacturing a phase-change suspension fluid including (i) preparing a suspension fluid by mixing and dispersing polyethylene oxide particles into a solvent including water and one or more types of compounds selected from the group consisting of ethylene glycol and propylene glycol; (ii) ultrasonicating the suspension fluid; and (iii) removing air from the suspension fluid by placing the ultrasonicated suspension fluid in a vacuum chamber.

The operation of (i) is an operation of preparing a suspension fluid by mixing and dispersing polyethylene oxide particles into a solvent including water and one or more types of compounds selected from the group consisting of ethylene glycol and propylene glycol, and the result is in a suspension fluid state in which fine solid particles are dispersed and floated in a liquid.

Next, the operation of (ii) is an operation of ultrasonicating the suspension fluid prepared in the operation of (i). This operation is carried out for uniformly dispersing the polyethylene oxide particles, and is preferably carried out for 9 to 12 hours. When the ultrasonication is carried out for less than 9 hours, there is a problem in that dispersion of the particles and the fluid in the suspension fluid is not completely achieved, and when the ultrasonication is carried out for greater than 12 hours, there is a problem in that manufacturing process becomes longer, and therefore, carrying out the ultrasonication in the above hour range is favorable.

The operation of (iii) is an operation of removing air by placing the ultrasonicated suspension fluid in a vacuum chamber, and is an operation for removing air bubbles included during the suspension fluid preparation. Herein, the air removal is preferably carried out for 9 to 12 hours. When the air removal is carried out for less than 9 hours, there is a problem in that all the air bubbles are not removed, and when the air removal is carried out for greater than 12 hours, there is a problem in that manufacturing process becomes longer, and therefore, carrying out the air removal in the above hour range is favorable.

The phase-change suspension fluid prepared as described above has a non-newtonian fluid property showing a shear-thinning flow behavior property. Specifically, in a normal flow, the phase-change suspension fluid has a physical property that viscosity decreases as the shear rate increases.

Accordingly, the phase-change suspension fluid according to the present disclosure is capable of reversible phase changes by the vibration of a vehicle, and may also be used for variable damping mechanism that is capable of controlling damping such as a suspension system, an isolator and an engine mount, and power systems such as a brake and a clutch.

EXAMPLES

Hereinafter, the present disclosure will be described in more detail through examples. However, these examples are for illustrative purposes only, and the scope of the present disclosure is not limited thereto.

Example

Examples 1-1 to 5-1 and Comparative Examples 1-1 and 2-1 (when Particles Having a Weight Average Molecular Weight of 100,000 are Used)

A suspension fluid was prepared by mixing polyethylene oxide particles (powder) having a weight average molecular weight of 100,000 to a solvent including a mixture of ethylene glycol and water according to constituent composition ratios shown in the following Table 1, and mechanically mixing the result for 1 hour using a blender. A phase-change suspension fluid was prepared by ultrasonicating the prepared suspension fluid for 12 hours in order to uniformly disperse the polyethylene oxide particles into the suspension fluid. Air bubbles were removed by placing the resulting suspension fluid in a vacuum chamber in order for removing air inside the fluid.

TABLE 1

Phase-change Suspension Fluid Composition and Content (Unit: g)

| Category | Polyethylene Oxide (PEO) | Ethylene Glycol (EG) | Water (Di-water) |
| --- | --- | --- | --- |
| Example 1-1 | 1.06 (5% by weight) | 10 | 10 |
| Example 2-1 | 2.22 (10% by weight) | 10 | 10 |
| Example 3-1 | 3.52 (15% by weight) | 10 | 10 |
| Example 4-1 | 5 (20% by weight) | 10 | 10 |
| Example 5-1 | 8.6 (30% by weight) | 10 | 10 |
| Comparative Example 1-1 | 0.02 (0.1% by weight) | 10 | 10 |
| Comparative Example 2-1 | 13.3 (40% by weight) | 10 | 10 |

Examples 1-2 to 5-2 and Comparative Examples 1-2 and 2-2 (When Particles Having a Weight Average Molecular Weight of 400,000 are Used)

A phase-change suspension fluid was prepared in the same manner as in Examples 1-1 to 5-1 and Comparative Examples 1-1 and 2-1 except that polyethylene oxide particles having a weight average molecular weight of 400,000 were used.

Examples 1-3 to 5-3 and Comparative Examples 1-3 and 2-3 (When Particles Having a Weight Average Molecular Weight of 900,000 are Used)

A phase-change suspension fluid was prepared in the same manner as in Examples 1-1 to 5-1 and Comparative Examples 1-1 and 2-1 except that polyethylene oxide particles having a weight average molecular weight of 900,000 were used.

Test Example

In order to measure rheological properties of the phase-change suspension fluid obtained in Examples 1-1 to 5-3 and Comparative Examples 1-1 to 2-3, viscosity and a damping factor were obtained while adjusting a shear rate and a frequency. The measurement geometry used herein was a double gap cell type and no external forces were applied to cup and bob. Moreover, the above process was carried out after re-dispersing the electrorhetorical fluid each time in order for ensuring test result accuracy. The measurement results are shown in FIG. 1a to FIG. 4b. Hereinafter, test results will be specifically described.

Figure 1A:
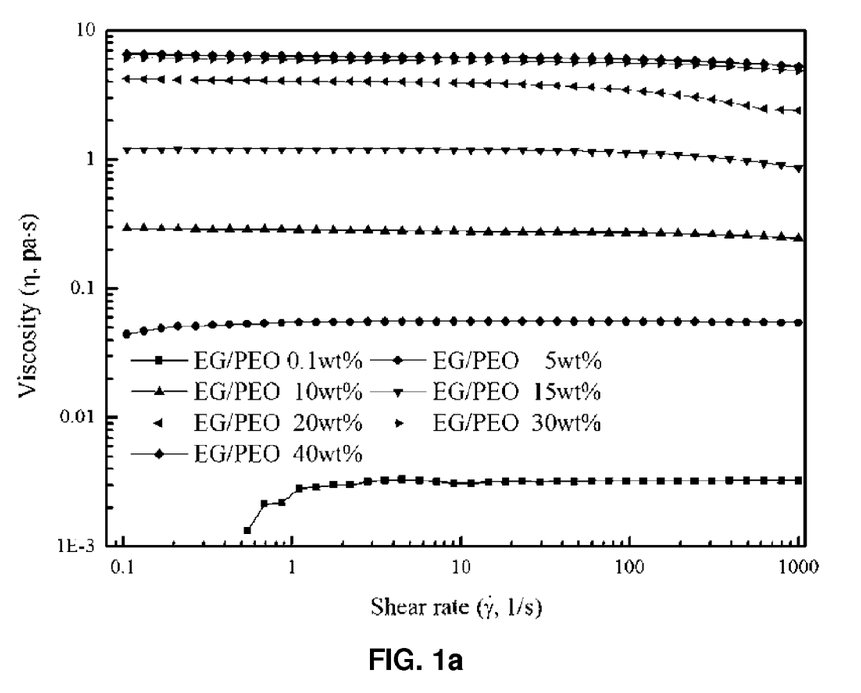
FIG. 1a is a graph showing test results of shear viscosity according to the shear rate of a phase-change suspension fluid including polyethylene oxide particles having a weight average molecular weight of 100,000.

FIG. 1a is a graph showing test results of shear viscosity according to the shear rate of the phase-change suspension fluid prepared in Examples 1-1 to 5-1 and Comparative Examples 1-1 and 2-1, and it was identified that the phase-change suspension fluid of Example 1-1 showed a newtonian behavior having constant viscosity under a low shear rate, but showed a non-newtonian behavior as the viscosity decreased and the phase-change suspension fluid became a liquid-like suspension under a high shear rate. However, it was identified that the phase-change suspension fluid of Comparative Example 1-1 including polyethylene oxide particles in less than 0.5% by weight had a viscosity change of a newtonian behavior, and when the polyethylene oxide particles were included in greater than 30% by weight, no significant differences were obtained compared to when the polyethylene oxide particles are included in 30% by weight.

Figure 1B:
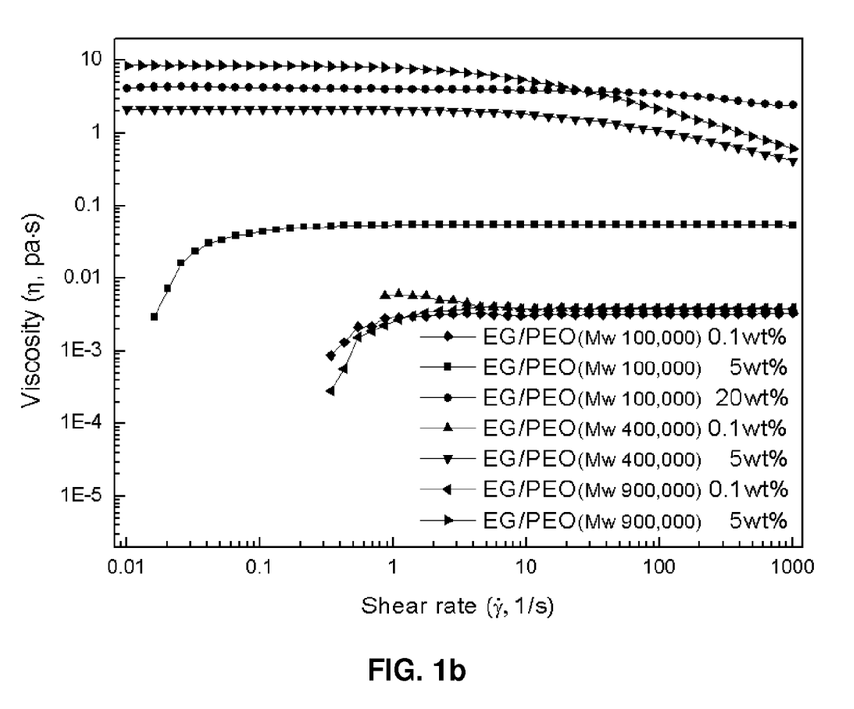
FIG. 1b is a graph showing test results of shear viscosity according to the shear rate of a phase-change suspension fluid including polyethylene oxide particles having a weight average molecular weight of 100,000, 400,000 and 900,000 respectively.

In addition, FIG. 1b is a graph showing test results of shear viscosity according to the shear rate of the phase-change suspension fluid including polyethylene oxide particles having a weight average molecular weight of 100,000, 400,000 and 900,000 each prepared in Examples 1-1 to 5-3 and Comparative Examples 1-1 to 2-3, and it was identified that FIG. 1b showed the same results as FIG. 1a.

Accordingly, it was identified that Example 1-1 to 5-3, which are phase-change suspension fluids according to the present disclosure, had a shear thinning fluid property under a high shear rate.

Figure 2A:
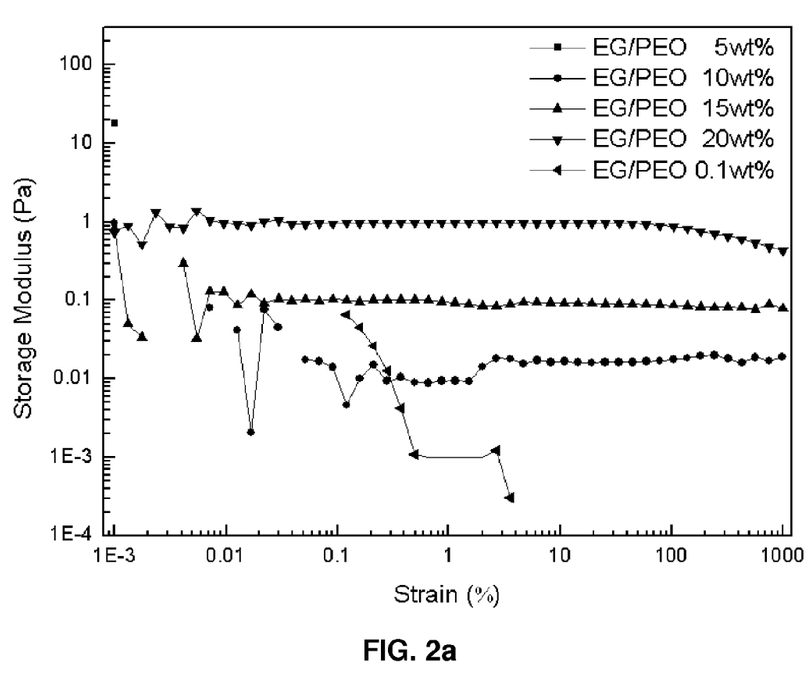
FIG. 2a and FIG. 2c are graphs showing test results of storage modulus and loss modulus according to the strain of a phase-change suspension fluid including polyethylene oxide particles having a weight average molecular weight of 100,000.
Figure 2B:
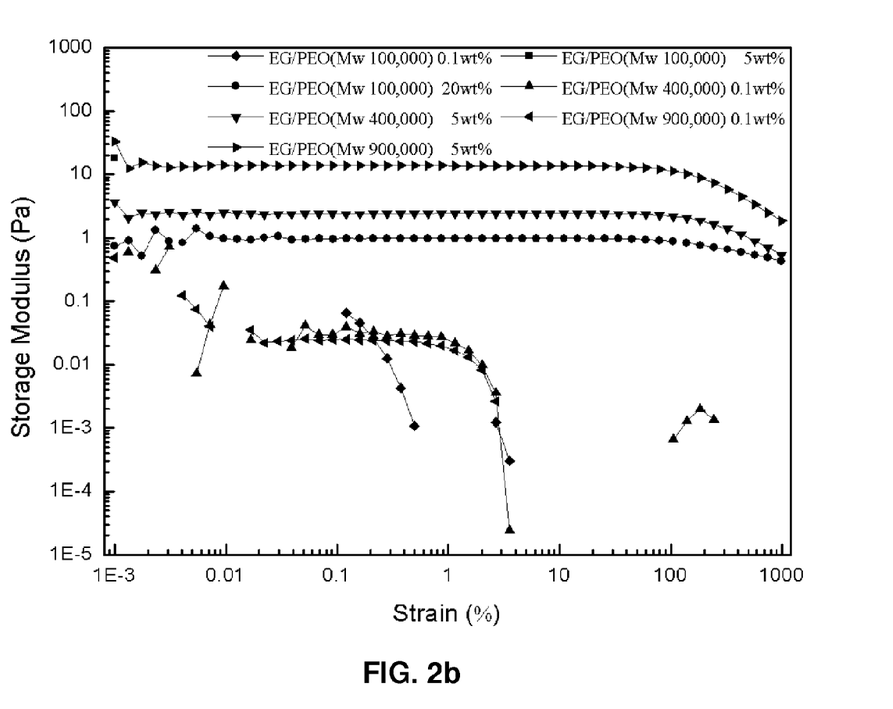
FIG. 2b and FIG. 2d are graphs showing test results of storage modulus and loss modulus according to the strain of a phase-change suspension fluid including polyethylene oxide particles having a weight average molecular weight of 100,000, 400,000 and 900,000 respectively.
Figure 2C:
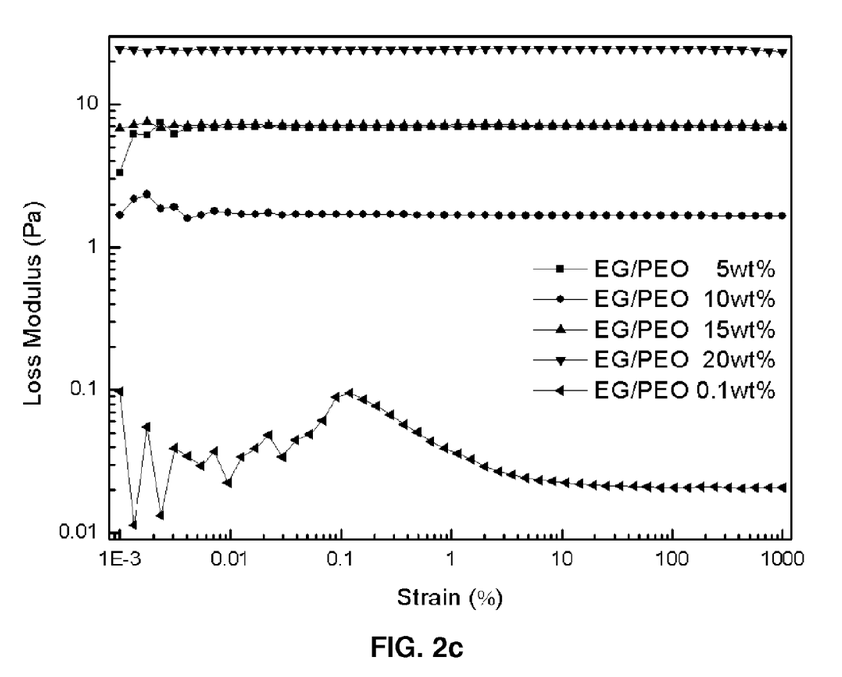

Next, FIGS. 2a and 2c are graphs showing test results of storage modulus and loss modulus according to the strain of the phase-change suspension fluid prepared in Examples 1-1 to 5-1 and Comparative Examples 1-1 and 2-1, and it was identified that the phase-change suspension fluid specifically showed modulus according to the strain with respect to 1 Hz of frequency, and based on this, a property showing a linear viscoelastic region was exhibited.

Figure 2D:
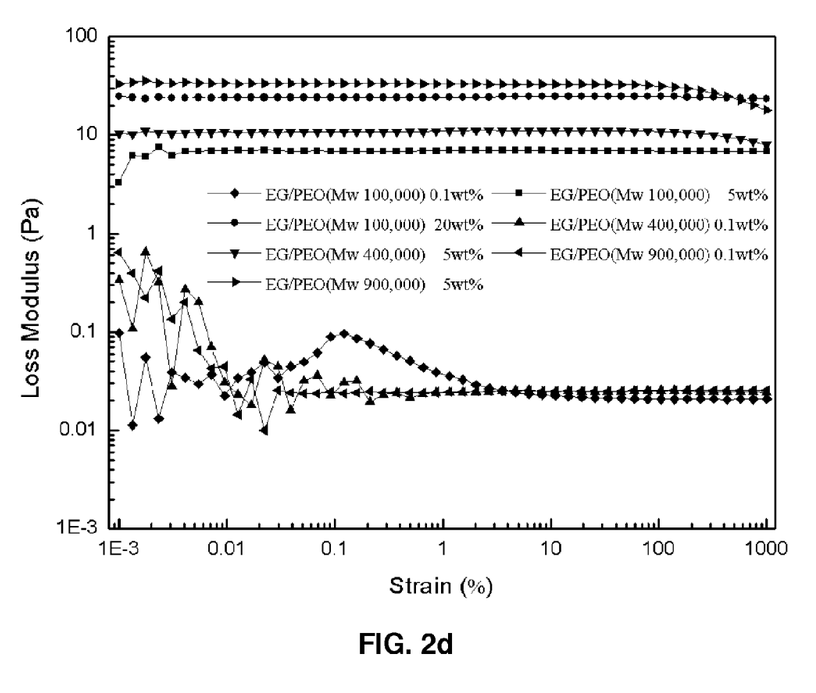

In addition, FIG. 2b and FIG. 2d are graphs showing test results of storage modulus and loss modulus according to the strain of the phase-change suspension fluid including polyethylene oxide particles having a weight average molecular weight of 100,000, 400,000 and 900,000 each prepared in Examples 1-1 to 5-3 and Comparative Example 1-1 to 2-3, and it was identified that the phase-change suspension fluid specifically showed modulus according to the strain with respect to 1 Hz of frequency, and based on this, a property showing a linear viscoelastic region was exhibited.

Figure 3A:
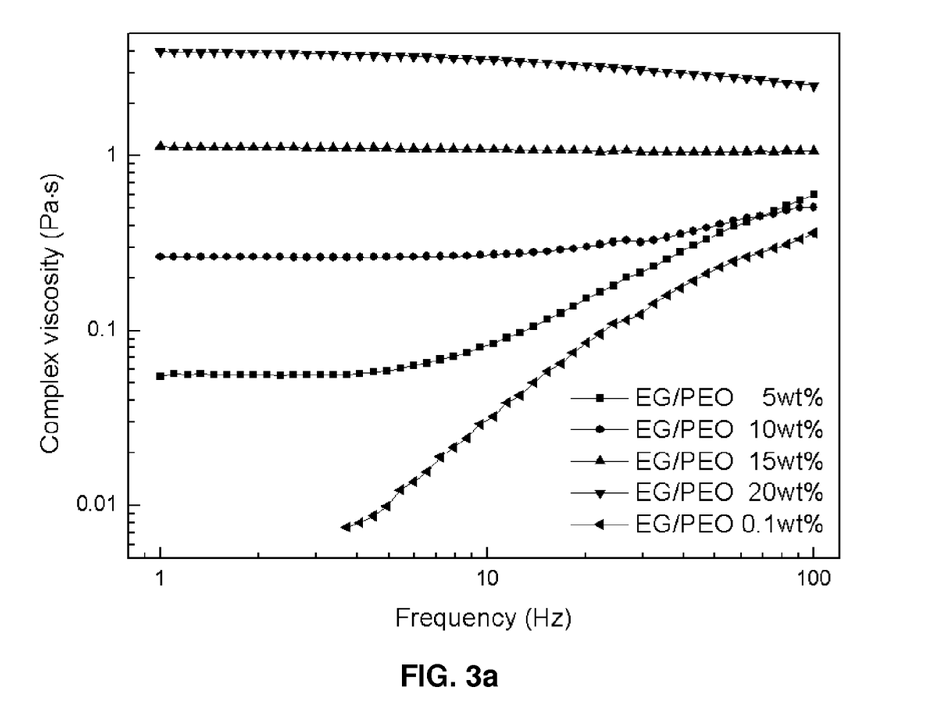
FIG. 3a is a graph showing test results of complex viscosity according to the frequency of a phase-change suspension fluid including polyethylene oxide particles having a weight average molecular weight of 100,000.

FIG. 3a is a graph showing test results of complex viscosity according to the frequency of the phase-change suspension fluid prepared in Examples 1-1 to 5-1 and Comparative Examples 1-1 and 2-1, and through the graph, a viscosity change rate according to the frequency change was able to be identified for each percentage.

Figure 3B:
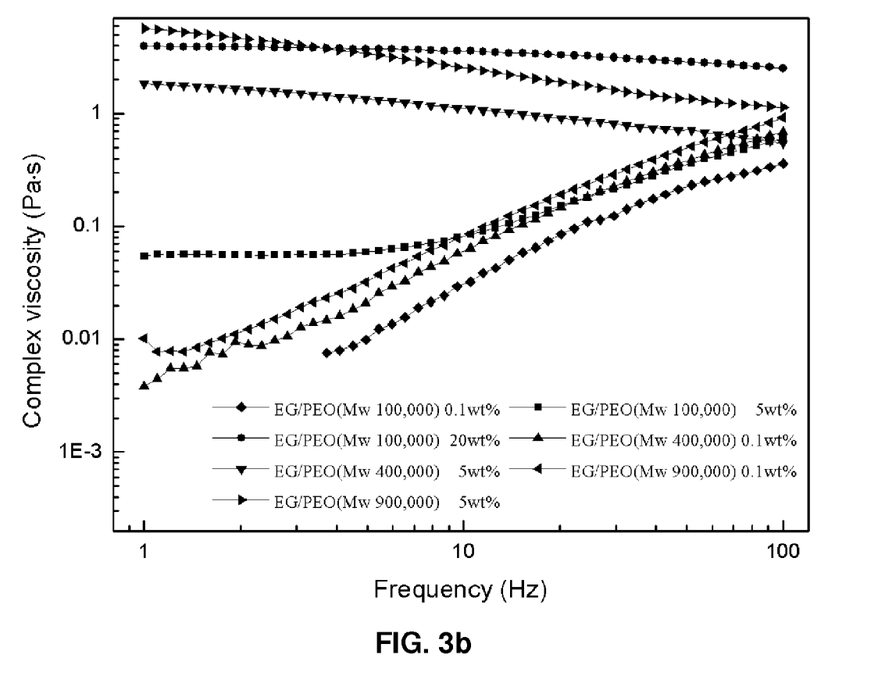
FIG. 3b is a graph showing test results of complex viscosity according to the frequency of a phase-change suspension fluid including polyethylene oxide particles having a weight average molecular weight of 100,000, 400,000 and 900,000 respectively.

FIG. 3b is a graph showing test results of complex viscosity according to the frequency of the phase-change suspension fluid including polyethylene oxide particles having a weight average molecular weight of 100,000, 400,000 and 900,000 each prepared in Examples 1-1 to 5-3 and Comparative examples 1-1 to 2-3, and through the graph, a viscosity change rate according to the frequency change was able to be identified for each percentage.

Figure 3C:
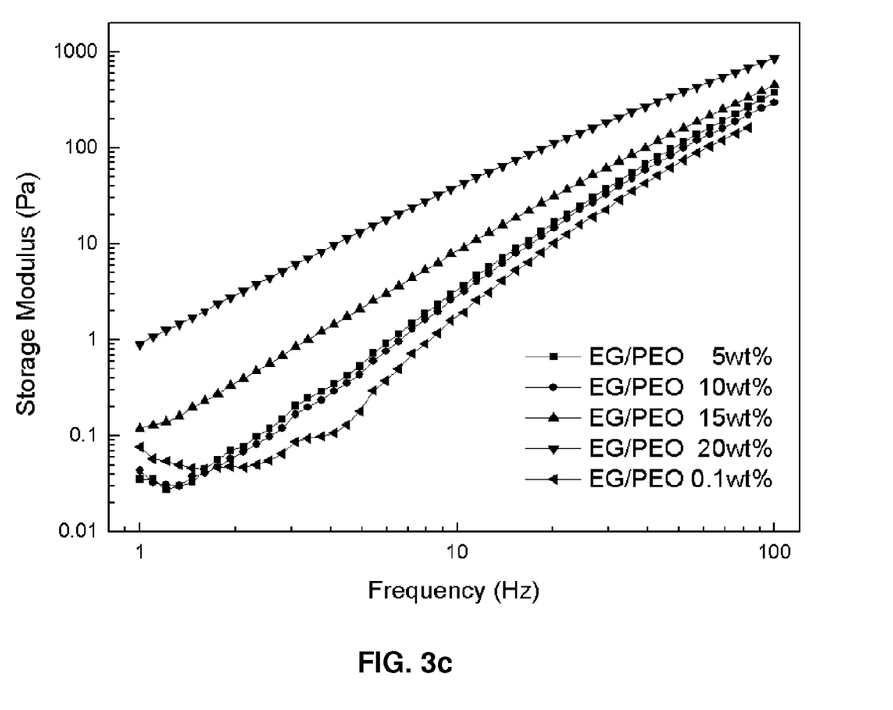
FIG. 3c is a graph showing test results of storage modulus according to the frequency of a phase-change suspension fluid including polyethylene oxide particles having a weight average molecular weight of 100,000.

FIG. 3c is a graph showing test results of storage modulus according to the frequency of the phase-change suspension fluid prepared in Examples 1-1 to 5-1 and Comparative Examples 1-1 and 2-1, and through the graph, it was identified that the phase-change suspension fluid specifically showed an elastic property of a phase-change fluid.

Figure 3D:
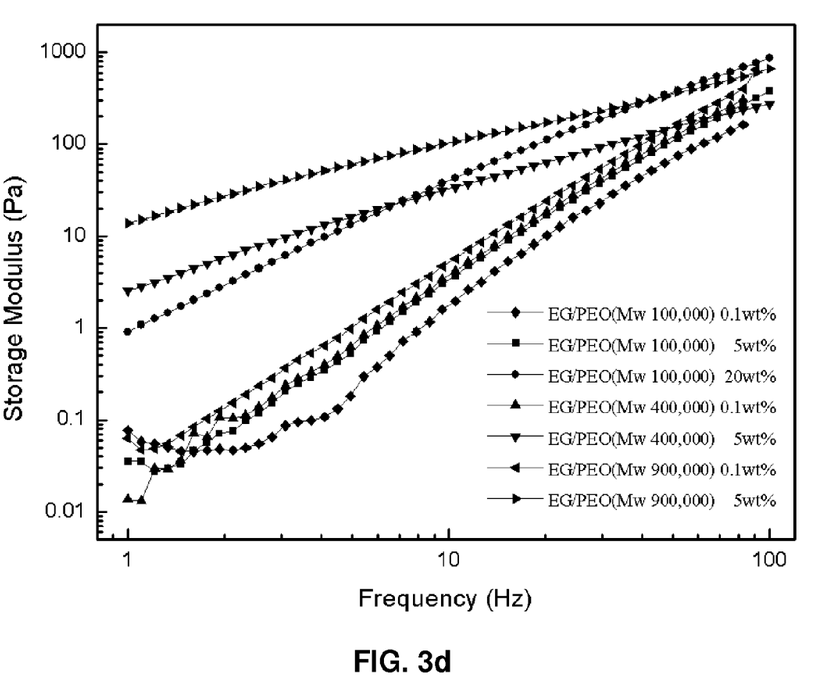
FIG. 3d is a graph showing test results of storage modulus according to the frequency of a phase-change suspension fluid including polyethylene oxide particles having a weight average molecular weight of 100,000, 400,000 and 900,000 respectively.

FIG. 3d is a graph showing test results of storage modulus according to the frequency of the phase-change suspension fluid including polyethylene oxide particles having a weight average molecular weight of 100,000, 400,000 and 900,000 each prepared in Examples 1-1 to 5-3 and Comparative Examples 1-1 to 2-3, and through the graph, it was identified that the phase-change suspension fluid specifically showed an elastic property of a phase-change fluid.

Figure 3E:
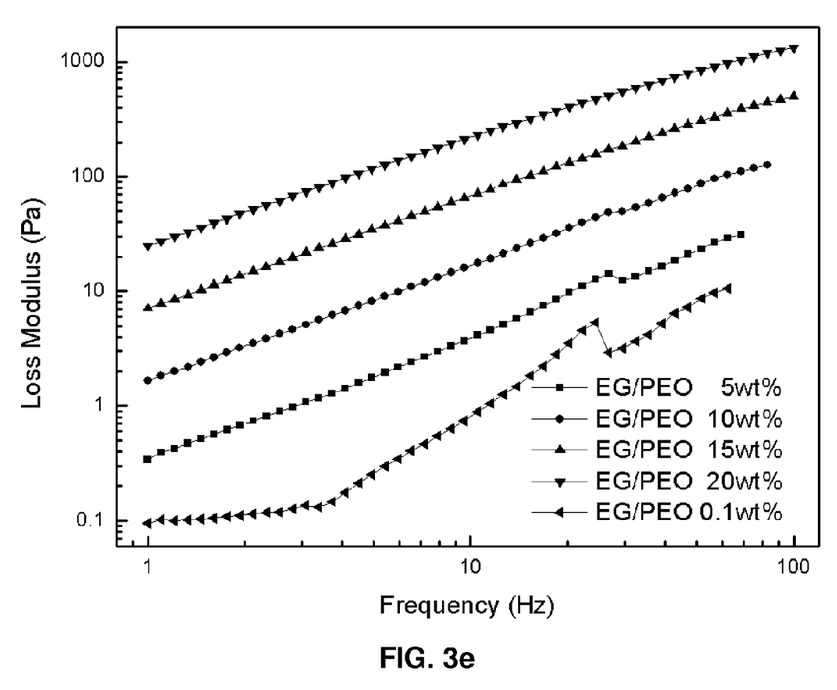
FIG. 3e is a graph showing test results of loss modulus according to the frequency of a phase-change suspension fluid including polyethylene oxide particles having a weight average molecular weight of 100,000.

FIG. 3e is a graph showing test results of loss modulus according to the frequency of the phase-change suspension fluid prepared in Examples 1-1 to 5-1 and Comparative Examples 1-1 and 2-1, and through the graph, it was identified that the phase-change suspension fluid specifically showed a viscosity property of a phase-change fluid.

Figure 3F:
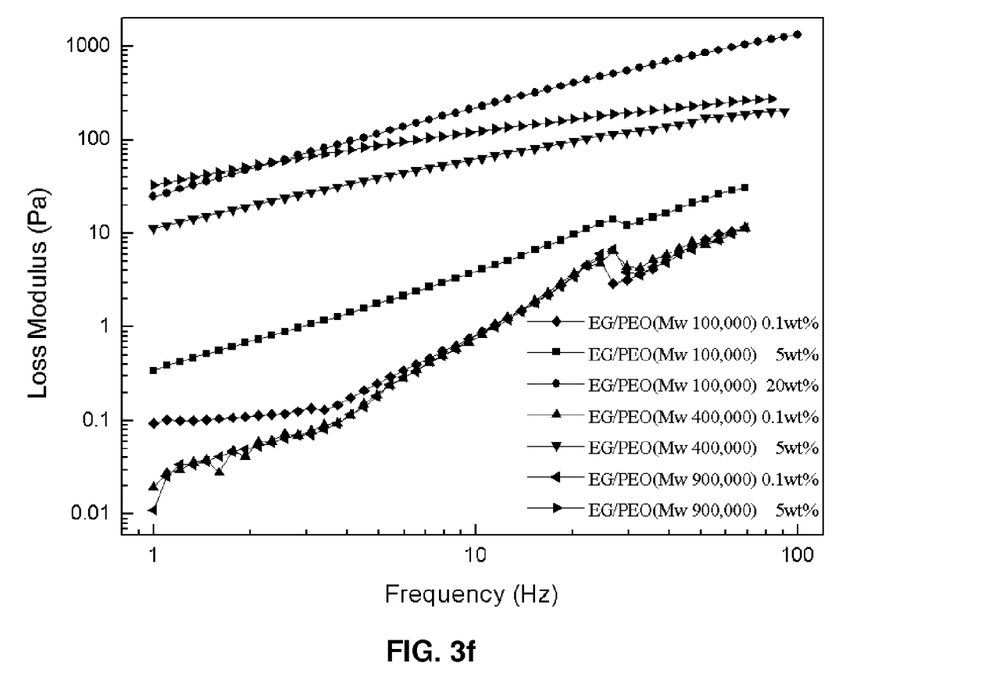
FIG. 3f is a graph showing test results of loss modulus according to the frequency of a phase-change suspension fluid including polyethylene oxide particles having a weight average molecular weight of 100,000, 400,000 and 900,000 respectively.

FIG. 3f is a graph showing test results of loss modulus according to the frequency of the phase-change suspension fluid including polyethylene oxide particles having a weight average molecular weight of 100,000, 400,000 and 900,000 each prepared in Examples 1-1 to 5-3 and Comparative Examples 1-1 to 2-3, and through the graph, it was identified that the phase-change suspension fluid specifically showed a viscosity property of a phase-change fluid.

Figure 4A:
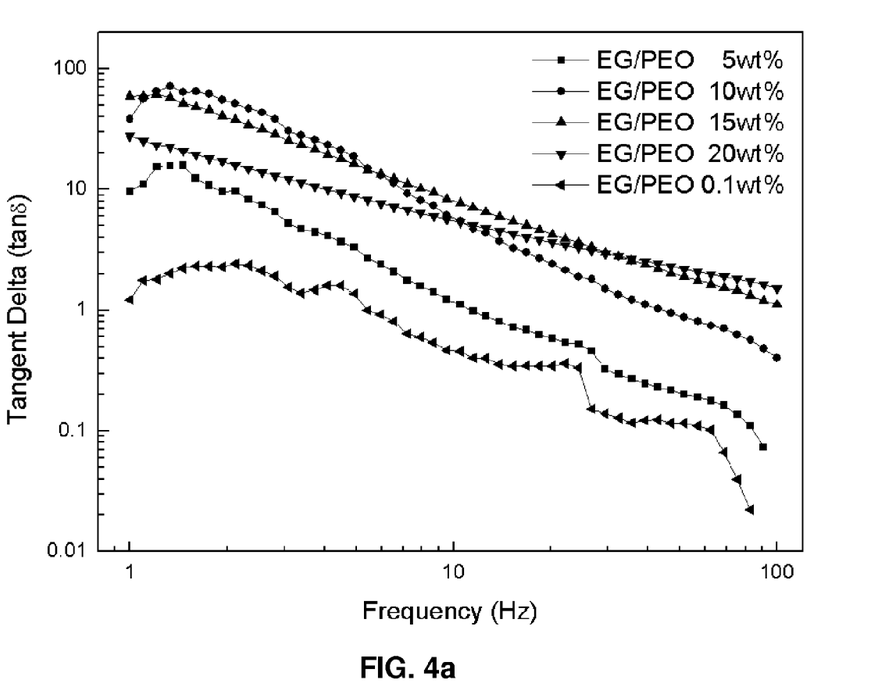
FIG. 4a is a graph showing test results of a damping factor according to the frequency of a phase-change suspension fluid including polyethylene oxide particles having a weight average molecular weight of 100,000.

FIG. 4a is a graph showing test results of a damping factor according to the frequency of the phase-change suspension fluid prepared in Examples 1-1 to 5-1 and Comparative Examples 1-1 and 2-1, and through the graph, it was identified that the phase-change suspension fluid specifically exhibited a viscosity property at a reference point of 1 or greater, and exhibited an elastic property at a reference point of 1 or less.

Figure 4B:
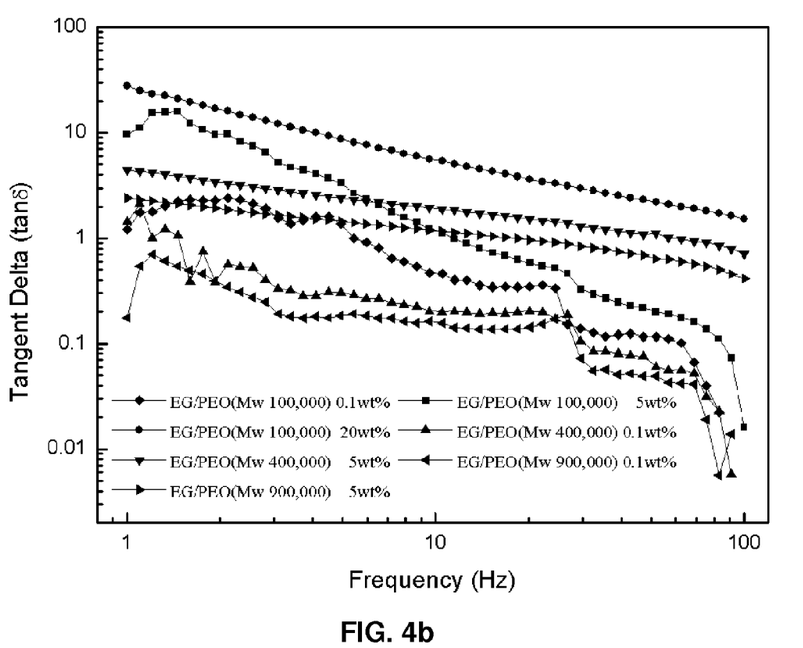
FIG. 4b is a graph showing test results of a damping factor according to the frequency of a phase-change suspension fluid including polyethylene oxide particles having a weight average molecular weight of 100,000, 400,000 and 900,000 respectively.

Lastly, FIG. 4b is a graph showing test results of a damping factor according to the frequency of the phase-change suspension fluid including polyethylene oxide particles having a weight average molecular weight of 100,000, 400,000 and 900,000 each prepared in Examples 1-1 to 5-2 and Comparative Examples 1-1 to 2-3, and through the graph, it was identified that the phase-change suspension fluid specifically exhibited a viscosity property at a reference point of 1 or greater, and exhibited an elastic property at a reference point of 1 or less.

Accordingly, it was identified that the phase-change suspension fluid according to the present disclosure showed a constant newtonian behavior in a low shear rate or low frequency region, but appeared as a shear-thinning fluid, which is a liquid-like suspension, showing a non-newtonian behavior in a high shear rate or high frequency region since viscosity decreased.

In other words, the present disclosure may provide an intelligent polymer-based dispersion fluid having advantages of a hydraulic bush in a low frequency region and advantages of a solid-type bush in a high frequency region, and capable of reversible phase changes by the vibration of a vehicle. The fluid may also be used for a variable damping mechanism that is capable of controlling damping such as a suspension system, an isolator and an engine mount, and power systems such as a brake and a clutch, and widely used in automotive and aviation industries.

The disclosure has been described in detail with reference to preferred embodiments thereof. However, it will be appreciated by those skilled in the art that changes may be made in these embodiments without departing from the principles and spirit of the disclosure, the scope of which is defined in the appended claims and their equivalents.

What is claimed is:

1. An automotive hydraulic bush having phase-change suspension fluid composition comprising:
    polyethylene oxide particles; and
    a solvent including water, ethylene glycol and propylene glycol,
    wherein the polyethylene oxide particles have a weight average molecular weight (Mw) of 100,000 to 900,000,
    the polyethylene oxide particles are included in 5 to 30% by weight with respect to the total weight of the phase-change suspension fluid composition.

2. The automotive hydraulic bush of claim 1, wherein the phase-change suspension fluid having first and second phases which reversibly change during operation of the automotive hydraulic bush having vibration.

3. A method for manufacturing an automotive hydraulic bush having a phase-change suspension fluid, the method comprising:
    (i) preparing a suspension fluid by mixing and dispersing polyethylene oxide particles into a solvent including water, ethylene glycol and propylene glycol;
    (ii) ultrasonicating the suspension fluid; and
    (iii) removing air by placing the ultrasonicated suspension fluid in a vacuum chamber,
    wherein the polyethylene oxide particles have a weight average molecular weight (Mw) of 100,000 to 900,000, and
    the polyethylene oxide particles are included in 5 to 30% by weight with respect to the total weight of the phase-change suspension fluid composition.

4. The method of claim 3, wherein the ultrasonification of the operation (ii) is carried out for 9 to 12 hours.

5. The method of claim 3, wherein the air removal of the operation (iii) was carried out for 9 to 12 hours.

6. The method of claim 3, wherein phase of the phase-change suspension fluid having first and second phases which reversibly change during operation of the automotive hydraulic bush having vibration.

* * * * *